July 21, 1942.   H. W. GREENUP ET AL   2,290,613
RUBBER COMPOSITION
Filed May 25, 1938
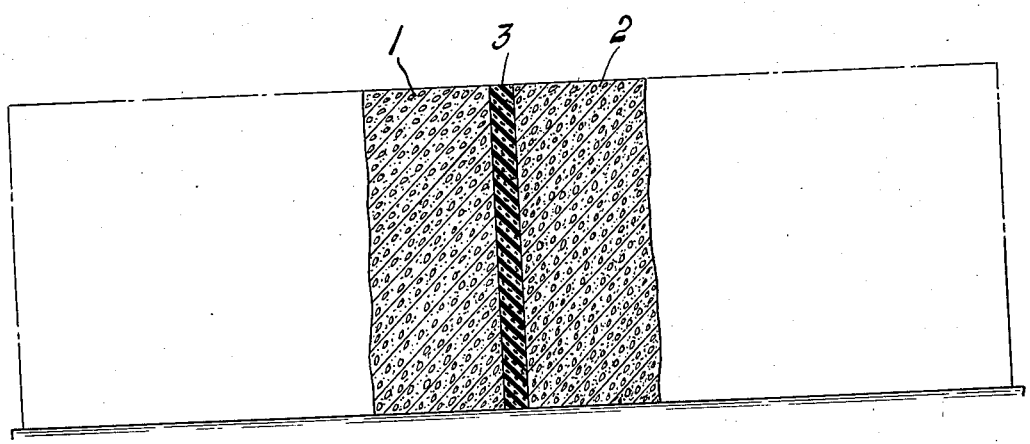
INVENTORS
HAROLD W. GREENUP
RUSSELL D. BYALL
BY
ATTORNEYS Patented July 21, 1942

2,290,613

UNITED STATES PATENT OFFICE 2,290,613

RUBBER COMPOSITION

Harold W. Greenup, Akron, and Russell D. Byall, Rex Lake, Ohio, assignors to The Firestone Tire & Rubber Company, Akron, Ohio, a corporation of Ohio Application May 25, 1938, Serial No. 209,949

6 Claims. (Cl. 260—728)

This invention relates to rubber compositions and particularly to a method of and composition for forming a rubber expansion joint.

One chief object of the present invention is to provide an easily practiced method of forming an expansion joint that positively fills the joint between the members.

Another object of the invention is to provide a spongy rubber composition which is easily prepared, remains suitably fluid to be poured into cracks, and is vulcanizable at room temperature.

The instant invention resides in forming a mixture of latex, a compressible porous substance and vulcanization agents capable of curing the latex at atmospheric temperatures. This mixture is maintained fluid by a suitable stabilizer so that it can be poured into a narrow joint between two members where vulcanization occurs to hold the compound permanently in position between the members.

The accompanying drawing shows a transverse section through an expansion joint constituting an embodiment of the invention. The ends of two concrete blocks or roadway sections 1 and 2, such as are formed in streets or highways, are shown in the drawing. The ends of these blocks must be spaced apart since the blocks expand and contract with changes in temperature. Thus the material placed between the blocks 1 and 2 must be compressed at times and expanded at others if it is continually to fill the varying sized space between the blocks. Of course, the blocks cannot be abutted due to the variations produced in their lengths, and an open space between the blocks is objectionable for obvious reasons. A spongy rubber composition 3 fills the space between the blocks in accordance with the teachings of this invention. The composition must be placed in the space while fluid when practicing the invention, for this greatly simplifies the production of the finished joint and facilitates adherence between the blocks and the rubber composition. With this purpose in view, latex is used as the source of the rubber, and it preferably is centrifuged to increase its rubber content prior to mixing it with the remainder of the ingredients. However, ordinary latex may be used when a thickening agent is also present in the mixture. Proper vulcanization agents are added to the latex, including sulfur and zinc oxide. In the practice of the invention, small amounts of other vulcanizers, such as piperidinium pentamethylene dithiocarbamate, which is commonly referred to as "Pip-Pip," and mercaptobenzothiazole are added to the latex so that it can be vulcanized at ordinary temperatures. Any ultra-accelerator such as butyl or ethyl zimate, or a combination of accelerators which will produce a cure at ordinary temperatures may be used to produce vulcanization. Since the cured product must stand both approximately 50% compression and extension, a compressible porous, or spongy, material is mixed with the rubber to aid in giving the desired compressibility to the final product. This material is finely divided and preferably comprises latex sponge, blown sponge, or foamed rubber, although natural sponge or other spongy substances could be substituted therefor.

Aluminous cement is normally added to the mixture to dehydrate it and to speed up the solidification thereof. When used, it produces a harder finished composition.

Of course, the liquid mixture should not solidify immediately upon receipt of the cement and this is prevented by the use of certain stabilizers in the mixture. The sodium salts of the one-half sulfate ester of a mixture of higher fatty alcohols which chiefly comprise lauryl and myristyl derivatives, which mixture is known as "Aquarex D," and 50% ammonium oleate are two stabilizers which have proven quite satisfactory. Any soluble soap or gum tragacanth are examples of other stabilizers which might be used.

A specific composition of my novel product which has given desirable results is:

| | Parts |
|---|---|
| Centrifuged latex | 166 |
| Aluminous cement | 20 |
| Sponge rubber | 60 |
| Ammonium sulfate | 6 |
| Sulfur | 1 |
| Zinc oxide | 2 |
| Mercaptobenzothiazole | .5 |
| Pip-Pip | .5 |
| Aquarex D | .5 |
| 50% ammonium oleate | 8 |
| Water | 3.8 |

However, these proportions need not be strictly adhered to for all conditions and the invention may be practiced by use of the ingredients within the following proportions:

| | | | |
|---|---|---|---|
| Concentrated latex | About 140 | to about 190 | parts |
| Aluminous cement | About 16 | to about 24 | parts |
| Sponge rubber | About 50 | to about 70 | parts |
| Ammonium sulfate | About 5 | to about 7 | parts |
| Sulfur | About .75 | to about 1.25 | parts |
| Zinc oxide | About 1.70 | to about 2.30 | parts |
| Mercaptobenzothiazole | About .4 | to about .6 | part |
| Pip-Pip | About .4 | to about .6 | part |
| Aquarex D | About .4 | to about .6 | part |
| 50% ammonium oleate | About 6 | to about 10 | parts |
| Water | About 0 | to about 75 | parts |

In preparing the composition, the latex is first stabilized with the Aquarex D and the ammonium oleate and then the remaining ingredients are singly or collectively added thereto in powder form. The stabilizers prevent the latex from coagulating upon the addition of aluminous cement as normally is the case, and also function to hold air in the latex, thus contributing to produce the compressibility desired in the product. Other substances, such as gum tragacanth can be used in place of the named stabilizers.

The mixture can be prepared in two portions to insure against undesired coagulation, if desired. This result is obtained by separating the zinc oxide from either the sulfur or the accelerators, and the two portions would be combined only immediately prior to pouring them into a joint. Usually the composition should be pressed into the joint and smoothed over by a trowel.

It is highly desirable that the finished product be sufficiently porous and have a quantity of air spaces in it so that the product is suitably compressible. Water originally present in the fluid substance aids in the formation of these cellular spaces so that its presence is desirable if it does not render the mixture too fluid. In some cases additional water may be put into the uncured mixture. The sponge rubber also contributes to porosity in the finished product and this result is secured by mixing an equal weight of 10% ammonium sulfate solution with the rubber and then drying it prior to adding the sponge to the remaining ingredients. Thus the ammonium sulfate coats upon the rubber particles and acts as a coagulant when it contacts latex. This coagulating action of the ammonium sulfate prevents latex from entering the inner pores, or cells, of the sponge particles so that the porosity of the sponge particles is preserved in the product. That is, the latex particles first touching the sponge are coagulated on the surface of the sponge, and they soon form a layer around the sponge. Other suitable coagulating agents, such as sodium silico fluoride, or salts of weak bases and strong acids, may be used in place of the ammonium sulfate when desired.

Another specific composition which has given an excellent product is:

| | Parts |
|---|---|
| Concentrated latex | 166 |
| Aquarex D | .8 |
| Gum tragacanth | 3.75 |
| Water | 255 |
| Sulfur | 1.5 |
| Pip-Pip | .5 |
| Mercaptobenzothiazole | .5 |
| Zinc oxide | 2 |
| Sponge rubber | 90 |
| Ammonium sulfate | 9 |

In this case the Aquarex D and the gum tragacanth are added to the latex as solutions and the sponge rubber treated as hereinbefore described. The remaining ingredients may be added in the form of aqueous dispersions. The specific proportions of the given ingredients can be varied either way about 15% from the given figures and the product still has the desired properties.

The gum tragacanth serves as a thickening agent to permit the addition of a considerable volume of water to the mixture without making the mixture too fluid. Thus by decreasing the volume of water added, the amount of gum can be reduced proportionally. If unconcentrated latex is used, necessarily smaller amounts of extra water are added to the mix.

The adjacent surfaces of the blocks 1 and 2 should be coated with a primer prior to pouring the rubber composition therein to insure proper adherence of the vulcanized rubber to the blocks and the latex mixture is poured into the joint before the primer coat dries. The primer may comprise latex and a silicate such as water glass. When aluminous cement is used it makes the water glass insoluble and aids in permanently sealing the joint.

A particular feature of the invention is that it gives a spongy rubber mass as a finished product, which mass has the compression and expansion properties required by building specifications. Then, too, the simple method of preparing the mixture as a self-curing fluid which can be poured into a joint where it solidifies at ordinary temperatures greatly facilitates use of the invention.

In some cases the rubber composition 3 may be placed only in the upper portion of the joint and a compressible substance, such as particles of sponge rubber, used to fill in the lower portion of the joint. It will be seen that the rubber composition 3 can be used to fill any cracks in highways or other structures and in each case it will form an adherent, tight seal that prevents leakage of water through the joint. The composition of the invention will set permanently in the time required for concrete to set so that it does not delay use thereof.

In accordance with the patent statutes, we have illustrated and described the principle and mode of operation of the preferred embodiment of the invention. However, it will be understood that various modifications can be made without departing from the scope of the invention as described in the appended claims.

We claim:
1. A composition for forming an expansion joint comprising from about 140 parts to about 190 parts of concentrated latex, from about 0 part to about 24 parts of aluminous cement, from about 50 parts to about 70 parts of sponge rubber, from about 5 parts to about 7 parts of ammonium sulfate, from about .75 part to about 1.25 parts of sulfur, from about 1 part to about 2.50 parts of zinc oxide, from about .25 part to about .6 part of mercaptobenzothiazole, from about .25 part to about .6 part of piperidinium pentamethylene dithiocarbamate, from about .4 part to about .6 part of the sodium salts of the one-half sulfate esters of a mixture of lauryl and myristyl alcohols, from about 6 parts to about 10 parts of 50% ammonium oleate, and from about 0 part to about 75 parts of water.

2. A composition for forming an expansion joint comprising latex, about 60 parts sponge rubber, about 6 parts ammonium sulfate, about 20 parts aluminous cement, about 1 part sulfur, about 2 parts zinc oxide, about .5 part mercaptobenzothiazole, about .5 part piperidinium pentamethylene dithiocarbamate, and about 8 parts ammonium oleate.

3. A composition of matter comprising latex, a stabilizing agent, soft open-celled rubber particles and a coagulant carried by said particles to coagulate the latex upon the outer surface of said particles.

4. An expandable and compressible composition of matter formed from a mixture comprising self-vulcanizing latex, and soft open-celled rubber particles having a surface layer of a latex coagulant.

5. An expandable and compressible composition of matter comprising self-vulcanizing latex rubber and open-celled rubber particles embedded in the latex rubber.

6. A composition of matter formed from a mixture comprising about 166 parts concentrated latex, about .8 part of the sodium salts of the one-half sulfate esters of a mixture of lauryl and myristyl alcohols, about 1.5 parts of sulfur, about .5 part of piperidinium pentamethylene dithiocarbamate, about .5 part mercaptobenzothiazole, about 2 parts of zinc oxide, about 90 parts sponge rubber, and about 9 parts ammonium sulfate.

HAROLD W. GREENUP.
RUSSELL D. BYSALL.